United States Patent [19]

Blackburn

[11] Patent Number: 4,536,871
[45] Date of Patent: Aug. 20, 1985

[54] SIGNAL DETECTOR APPARATUS

[75] Inventor: Tom L. Blackburn, San Jose, Calif.

[73] Assignee: GTE Communications Products Corporation, Phoenix, Ariz.

[21] Appl. No.: 517,310

[22] Filed: Jul. 26, 1983

[51] Int. Cl.³ ............................................... H04B 1/14
[52] U.S. Cl. ..................................... 370/74; 328/133; 329/50
[58] Field of Search ............... 329/50, 131, 133, 134, 329/145, 163; 455/324, 326, 337, 343; 307/522, 529; 328/133, 138, 160, 150; 179/84 VF; 340/825.48, 825.71; 324/83 R, 83 A; 370/74, 98

[56] References Cited

U.S. PATENT DOCUMENTS

| 2,790,898 | 4/1957 | Bady | 329/50 |
| 2,979,611 | 4/1961 | Halina | 328/133 |
| 4,307,347 | 12/1981 | Thomson | 329/50 |

Primary Examiner—Joseph A. Orsino, Jr.
Attorney, Agent, or Firm—Douglas M. Gilbert

[57] ABSTRACT

A signal detection circuit having a balanced modem is described. A switching circuit responsive to a selected linear input signal provides a square wave having the same frequency as the linear input signal. The modem, using a DC bias provided from the square-wave signal, is responsive to the square wave and linear input signals for providing a DC output having a magnitude proportional to the magnitude of the selected linear input signal.

10 Claims, 2 Drawing Figures

SIGNAL DETECTOR APPARATUS

The present invention relates to carrier signal detection circuits in general, and in particular, to a detection circuit for providing a DC output signal whose amplitude is proportional to the amplitude of a selected one of a plurality of AC carrier signals having closely-spaced center frequencies.

BACKGROUND OF THE INVENTION

In a conventional telephone and radio multiplex system there may be transmitted simultaneously a plurality of narrow band carrier signals, each having a predetermined center frequency, e.g., 88 kHz±10 Hz. In a typical frequency bandwidth of 88-160 kHz, the plurality of carrier signals in such a system may be transmitted with a relatively close spacing, e.g., 4 kHz. At some point in such a system, there is a need to select from among the described plurality of narrow band closely spaced carrier signals, a carrier signal having a particular center frequency. For example, a pilot signal, which is sent in the same band as a group of modulated carrier signals, is detected and used by transmission equipment for a variety of functions.

Heretofore, the selection of a carrier signal from among a plurality of other signals having closely-spaced center frequencies has required the use of costly and complex circuits. Typical of such circuits is a circuit comprising a conventional high Q, LC bandpass filter network and operational amplifier assembly.

With the ever-increasing demand on the providers of communication systems to reduce costs, the need for circuits of small size and low power consumption, and the expanding use of solid state circuits in communication networks, the elimination of such costly and complex conventional circuit components as the aforementioned LC-operational amplifier assembly, is desirable.

SUMMARY OF THE INVENTION

For the foregoing reasons, a principle object of the present invention is an improved level detection circuit providing a DC output signal whose amplitude is proportional to the amplitude of a selected one of a plurality of AC carrier signals having different center frequencies.

Another object of the present invention is a circuit as described above wherein each of the carrier signals has a bandwidth of approximately ±10 Hz and are spaced approximately 4 kHz apart.

Still another object of the present invention is a circuit as described above which eliminates the need for a separate source of biasing potential.

A principle feature of the present invention is the provision of a conventional integrated circuit balanced modulator/demodulator called a modem. The modem is provided with a bias potential input, a switched square-wave or non-linear carrier signal input, a linear signal input and an output. The carrier signal input is provided from the output of a comparator which comprises a zero-crossing squaring circuit responsive to a desired linear input signal and a reference signal.

In operation, the modem compares the phase difference between the non-linear carrier signal and the desired linear signal. Because the phase difference between the two signals is always zero, the modem provides at its output a DC signal having an amplitude proportional to the amplitude of the desired linear signal.

BRIEF DESCRIPTION OF THE DRAWINGS

The above and other objects, features and advantages of the present invention will become apparent from the detailed description of the accompanying drawing in which.

DETAILED DESCRIPTION OF THE DRAWINGS

Figure 1:
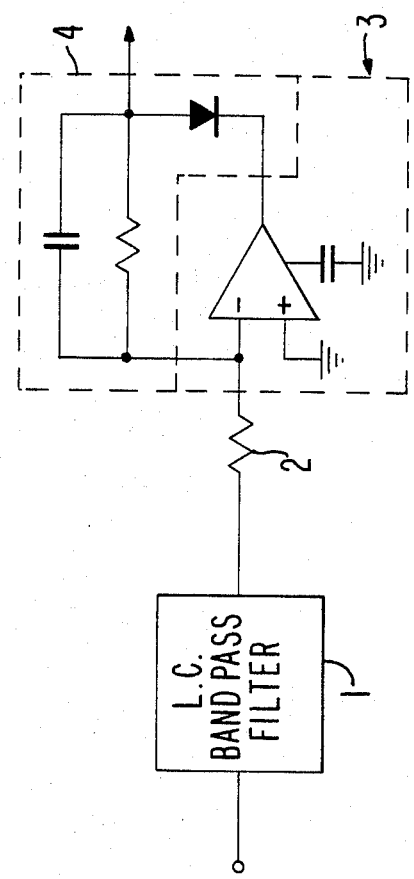
FIG. 1 is a block diagram of a prior art signal detection apparatus.

Referring to FIG. 1, there is shown a conventional carrier signal detection circuit comprising a bandpass filter network 1, an input resistor 2, and an operational amplifier 3 comprising a capacitive-resistive-diode feedback circuit 4. In circuits of the type shown in FIG. 1, the bandpass filter network 1 typically comprises a relatively expensive, very high-Q LC filter network. The LC network 1 must reject the out-of-band signals at least 30 dB to avoid interferring signals producing DC outputs. With an ever-increasing need for circuits of small size, low power consumption and low manufacturing cost, it is desirable to avoid the use of LC bandpass filter networks as shown in FIG. 1 whenever possible.

Figure 2:
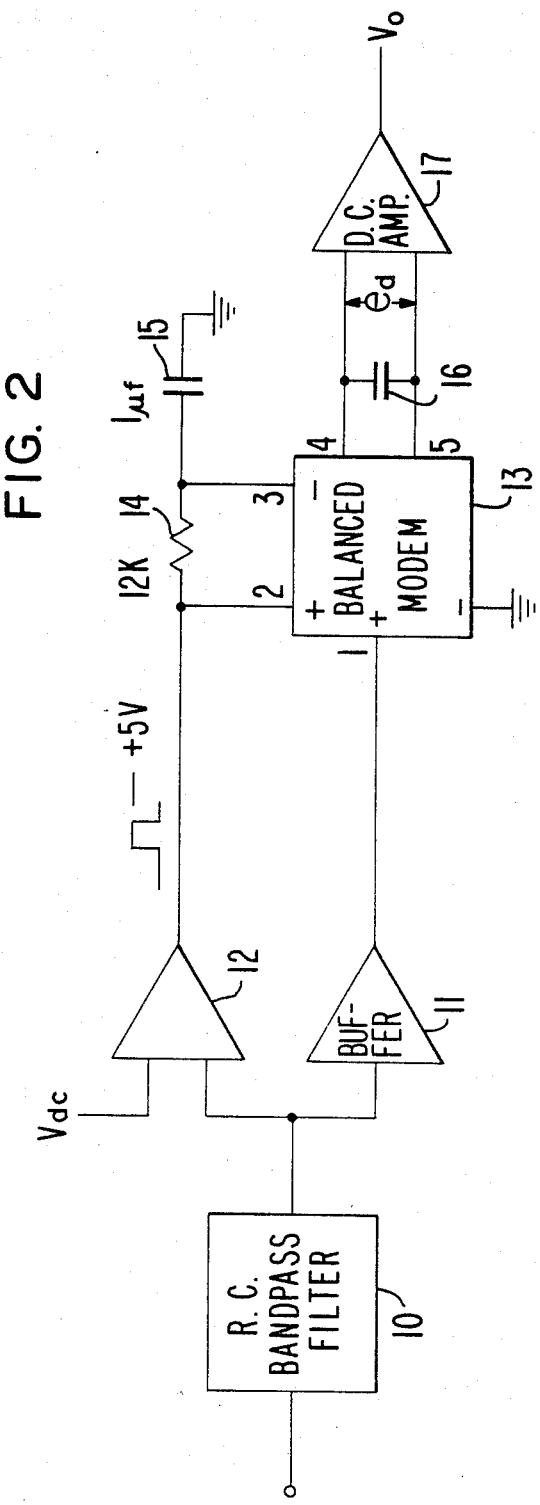
FIG. 2 is a block diagram of a detection circuit in accordance with the present invention.

Referring to FIG. 2, there is provided in accordance with the present invention, a relatively simple, inexpensive RC filter network 10. The filter network 10 is provided for selecting a relatively narrow band carrier signal having a predetermined center frequency from among a plurality of narrow band carrier signals having relatively closely-spaced center frequencies. For example, in a typical frequency bandwidth of 88-160 kHz, the plurality of carrier signals may be transmitted with a center frequency spacing of 4 kHz. The circuit in FIG. 2, requires that the amplitude of any unwanted signals be at least 10 dB below the pilot frequency. Depending on frequency and bandwidth, an LC filter network would be required in some circumstances. But the complexity of such a network would be significantly less than that required for the LC circuit 1 shown in FIG. 1.

Coupled to the output of the RC bandpass filter network 10, there is provided a buffer amplifier 11 and a zero crossing switching circuit 12. The buffer amplifier 11 is provided to buffer the input signal source of filter network 10 from a balanced modem 13 coupled to the output of the amplifier 11. The zero crossing switching circuit 12 is provided with a DC reference voltage input $V_{dc}$, (5 volts), and provides at its output a square wave signal having the same frequency as the selected carrier signal applied to its input.

As shown in FIG. 2, the output of the buffer 11 is coupled to pin 1, called the signal input, of modem 13. The output of the switching circuit 12 is coupled to a pin 2 called the carrier input of the modem 13, through a resistor 14 to pin 3 (called the bias input) of modem 13. It is further coupled through a capacitor 15 to ground. The resistor 14, typically 12k ohms, and the capacitor 15, typically 1 microfarad, provides a DC bias on pin 3, of 2.5 volts DC from a 5 volt square wave within the bandwidth of 88-160 kHz. The RC filter formed by resistor 14 and capacitor 15 simply acts as a low pass filter to produce the average value of voltage (2.5 V)

from the square wave at zero crossing detector circuit 12 output. The output of the modem 13 appears across pins 4 and 5 thereof. Coupled between pins 4 and 5 there is provided a capacitor 16 and a DC amplifier 17. The modem 13 is a conventional modulator-demodulator such as the LM1596/LM1496 balanced modulator-demodulator manufactured by National Semiconductor Corporation, Santa Clara, Calif.

In operation, the modem 13 produces an output signal $e_d$ at pin 4 and pin 5 which is the product of the input signal voltage at pin 1 and the switched carrier input signal voltage at pin 2.

The operation of the modem 13 is described by the following equations:

$e_0$ = input signal at pin 2 (switched square wave)
$e_1$ = input signal at pin 1 (linear signal)

If $e_1 = \sqrt{2}\, E_1 \sin[\omega_0 t + \phi_1(t)]$, and $e_0 = \sqrt{2}\, E_0 \sin[\omega_0 t + \phi_2(t)]$, then, the output of the multiplier (in the modem 13) is $e_d = e_1 \cdot e_0 =$ $2E_1 E_0 \sin[\omega_0(t) + \phi_1(t)] \cdot \cos[\omega_0(t) + \phi_2(t)'] =$ $E_1 E_0 (\sin[\phi_1(t) - \phi_2(t)', 8 + \sin[w107_0(t) + \phi_1(t) + \phi_2(t)'])$ where $\phi_2(t)' = \phi_2(t) - 90°$ The capacitor 16 between pins 4 and 5, which may comprise a relatively small capacitance, is provided to filter out any AC component in the multiplier output. The DC term is the difference between the phase angle $e_1$ and $e_0$.

It can be seen from the equation above that the maximum DC component occurs when the angle between $\phi_1(t)$ and $\phi_2(t)'$ is 90° or 270°, i.e., sin 90° = +1 and sin 270° = −1. Since $\phi_2(t) = \phi_2(t)' \pm 90°$, the output $e_d$ is maximum when the difference between $\phi_1(t)$ and $\phi_2(t)$ is 0° or 180°. Moreover, since the two signals applied to pins 1 and 2 are always of the same phase (same frequency,) the phase difference between them is zero which produces the DC voltage output $e_d$. This DC value is either positive or negative about the quiescent DC operating point of the modem 13 and varies with increase/decrease of the level at pin 1 of the modem 13. It may also be noted that other frequency components, if at least 10 dB below the desired signal, cause little change in the signal at the output of switch 12. The undesired signal at pin 1 create a phase difference when compared to the switched signals at pin 2, thus producing a symmetrical signal about the quiescent DC level operating point of the modem 13. Any AC component gets filtered out by capacitor 16 and DC amplifier 17. Since the output signal (across pins 4 and 5) is a balanced line, an AC component would only appear as a voltage from the line to ground. Therefore amplifier 17 only produces a DC signal as $V_0$.

While the technique of applying equal signal frequencies to a phase detector is not new, as this is done in any conventional phase lock loop which uses a voltage controlled oscillator reference input, in the apparatus of the present invention, it should be noted that the reference frequency is derived, not from a separate source, but from the band of frequencies applied to the input of the apparatus. In this regard, it should also be noted that, instead of using a separate source of bias potential, the modem 13 is biased using the output of the switching circuit 12.

While a preferred embodiment of the present invention is disclosed and an alternative embodiment suggested, it is contemplated that still other changes may be made to the embodiments disclosed without departing from the spirit and scope of the present invention. Accordingly, it is intended that the above description of the invention be considered only for purposes of illustrating the invention and that the scope of the invention be determined solely by reference to the claims hereafter provided and their equivalents.

What is claimed is:

1. A carrier level detection circuit comprising:
   first filter means having an input and an output for selecting a desired carrier signal;
   a switching means connected to said filter means output and converting said carrier signal to a square-wave signal having a repetition rate corresponding to the frequency of said carrier signal; and
   a balanced modem having a first signal input, a switched signal input and an output, said switched signal input receiving said square-wave signal, said first signal input receiving said carrier signal, said balanced modem producing an output signal equal to the product of the input signals applied thereto and said output signal having a DC magnitude proportional to the magnitude of said carrier signal.

2. A detection circuit according to claim 1 wherein said switching means comprises a zero-crossing squaring circuit.

3. A detection circuit according to claim 1 comprising means responsive to said square-wave signal for providing a bias potential to said circuit means.

4. A detection circuit according to claim 3 wherein said bias potential providing means comprises an RC circuit means.

5. A detection circuit according to claim 1 further comprising AC signal filtering means coupled to said modem output for rejecting AC signals at the output thereof.

6. A detection circuit according to claim 5, wherein said AC signal filtering means comprises capacitance filtering means.

7. A detection circuit according to claim 1 wherein said circuit means comprises means for buffering said first filtering means output from said modem first signal input.

8. In a communication system a pilot level detection circuit providing a DC output signal proportional to the level of a pilot signal, said circuit comprising:
   bandpass filter means for selecting said desired pilot signal;
   switching means for converting said pilot signal to a square-wave signal having a repetition rate corresponding to the frequency of said pilot signal;
   a balanced modem having a first signal input for receiving said pilot signal, a switched signal input for receiving said square-wave signal, and an output producing a DC output signal having a magnitude proportional to the magnitude of said pilot signal; and
   lowpass filter means for rejecting AC signals at said modem output.

9. A pilot detection circuit according to claim 8 wherein said switching means comprises a zero-crossing squaring circuit.

10. A pilot detection circuit according to claim 9, said balanced modem having a bias input, said detection circuit further comprising lowpass filter means coupling said switched signal input to said bias input and filtering said square-wave signal to provide said balance modem with a source of bias potential.

* * * * *